July 13, 1965   R. S. HOOPER   3,194,513
AIRCRAFT
Filed Dec. 17, 1962   2 Sheets-Sheet 1
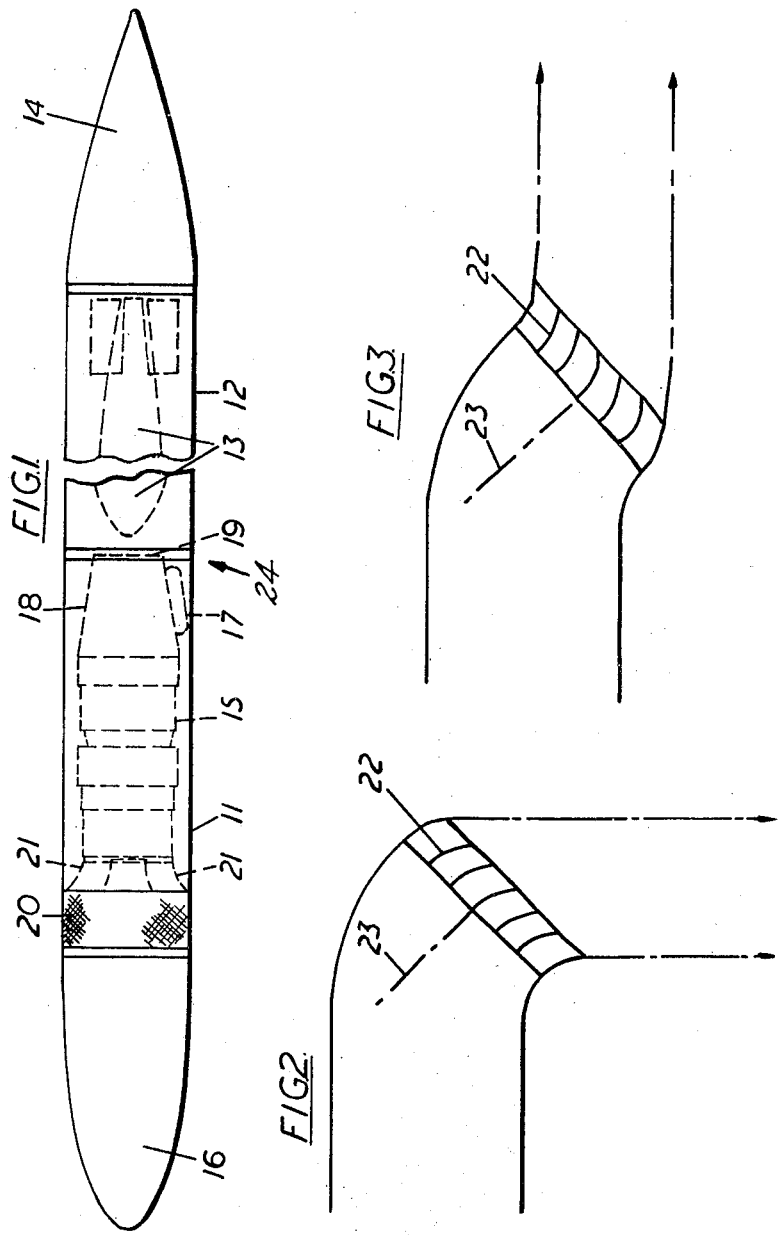
Inventor
Ralph Spenser Hooper
By Dowell + Dowell
Attorney July 13, 1965   R. S. HOOPER   3,194,513
AIRCRAFT Filed Dec. 17, 1962   2 Sheets-Sheet 2

Inventor
Ralph Spenser Hooper
By Dowell Dowell
Attorneys

United States Patent Office 3,194,513
Patented July 13, 1965

3,194,513
AIRCRAFT
Ralph Spenser Hooper, Ham, England, assignor to Hawker
Aircraft Limited, Surrey, England, a British company
Filed Dec. 17, 1962, Ser. No. 245,174
Claims priority, application Great Britain, Dec. 20, 1961,
45,724/61
6 Claims. (Cl. 244—23)

This invention relates to aircraft and especially, but not exclusively, to those with a vertical or short take off and landing capability.

In vertical or short take off aircraft that are required to lift considerable loads such as cargo or armaments, the ordinary method of design is to fix a maximum load that the aircraft is to be capable of lifting and then to provide for the aircraft power plant that will give to it that lifting capability. That is to say, during its life of service the maximum load-carrying capacity of the aircraft is fixed and the aircraft power plant that enables the aircraft to lift the maximum is always present as a part of the total weight penalty even when the aircraft is flying unladen or when its full load capacity is not required. It is an object of this invention to enable cargo or armament carrying aircraft to be operated in a more convenient manner with better economy.

According to the present invention, there is provided a pod arranged for ready attachment to and detachment from the structure of an aircraft which pod embodies at least one lifting engine together with one or more compartments or bays to receive a useful load. By attaching such a pod or pods to an aircraft the lifting capability of the aircraft can be increased as more load is added; and the aircraft does not have to bear the full weight penalty of power plant designed to lift the greatest possible load when it is flying unladen or with comparatively light loads.

While the engine embodied in each pod is primarily to give additional lift and may therefore be a jet-propulsion engine with its jet efflux directed downwardly, or capable of being directed downwardly, an attractive feature of the arrangement is that by making provision for the jet to be directed rearwardly at will the engine can be used for emergency propulsion. This can be combined with construction of the pod in two portions, the one embodying the engine and the other the load compartment, and the ability to jettison the portion of the pod containing the load if circumstances so demand.

Some details of how the invention can be reduced to practice will now be given by way of example and with reference to the accompanying drawings, in which:

FIGURE 1 is a diagrammatic elevation of a pod in accordance with the invention,

FIGURES 2 and 3 are two views illustrating diagrammatically an alternative form of engine jet outlet nozzle for a pod such as that of FIGURE 1.

Figure 4:
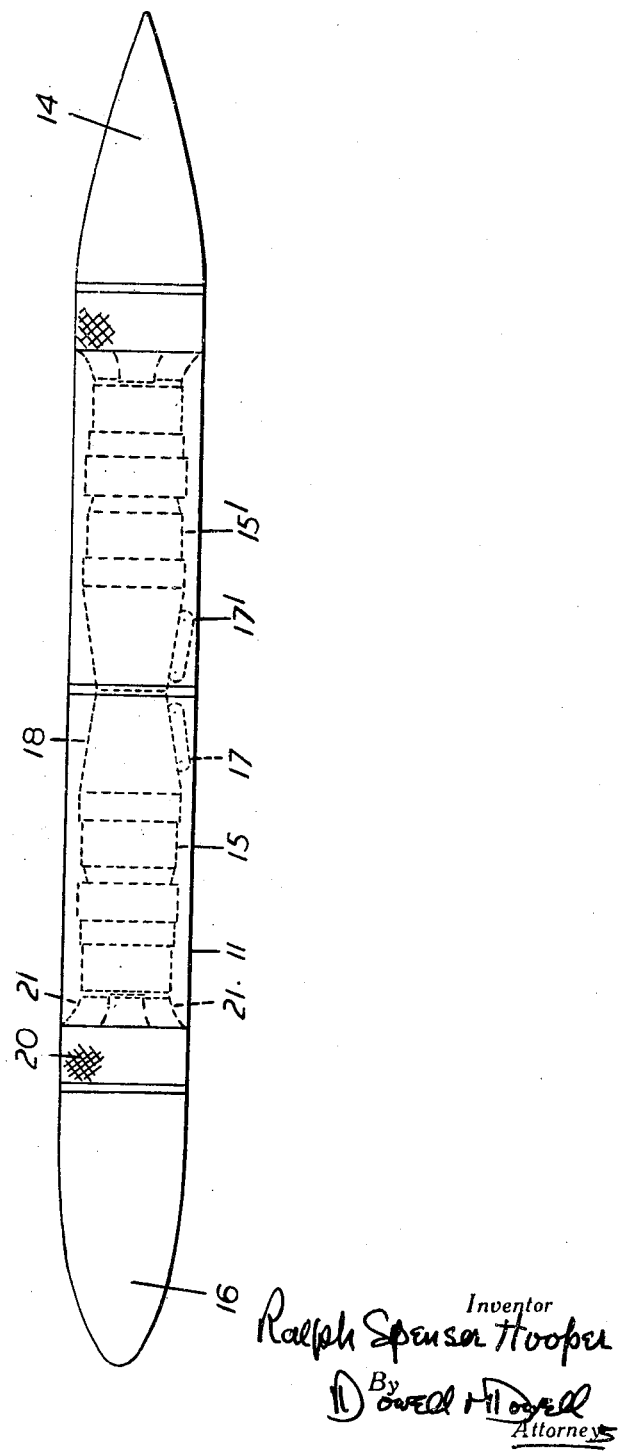
FIGURE 4 is a diagrammatic elevation of a pod arrangement alternative to that of FIGURE 1.

Referring to FIGURE 1, the pod shown therein is divided into a front half 11 and a rear half 12 with quick-action joints at the region indicated at 24, for connecting the two halves together and allowing them to be separated. In the rear half 12 there is a load compartment 13 and also, if desired, a separable streamline tail section 14 providing a fuel storage tank at the rear of the load compartment. In the front half 11 is the engine 15, with a further fuel tank or load compartment in a separable streamline nose section 16 of the pod forward of the engine.

The lifting engine 15 is mounted in a horizontal attitude with its axis extending fore-and-aft. The engine can thus be accommodated in a comparatively slender pod, with reduced drag penalty as compared with the case where a lifting engine is disposed with its axis vertical. At the rear end of the engine there is a nozzle 17 to direct the jet efflux downwardly through an opening in the bottom wall of the pod, the effluent gases being turned from the horizontal down through almost a right angle in the nozzle box 18. There can, if desired, be provision for changing the direction of the jet efflux to rearward at will, to give emergency forward thrust instead of upthrust, and one way of accomplishing this is by means of a nozzle assembly incorporating a second nozzle, such as is indicated at 19, with means for directing the jet efflux through one nozzle or the other. The second nozzle would be directed horizontally aft toward the rear half 12 of the pod embodying the load compartment 13 and would not normally be used.

Such pods can be employed in pairs, for example attached one below each wing of an aircraft; several pairs of pods can if desired be mounted on a single aircraft. With the double nozzle assembly the rear half 12 of each pod, containing the load, can be jettisoned in an emergency thereby allowing the jet efflux of the engine 15 to be re-directed rearwardly through the nozzle at 19 that is not ordinarily used so that the engine provides emergency propulsive thrust. Furthermore, if the lifting thrust provided by the engine of a pod is about equal to its loaded weight, a large asymmetric force due to engine failure in one pod of a pair can be avoided by dropping the pod involved. It will be understood that, in general, the lifting engine will only be used to provide upward thrust on the aircraft during take off, and perhaps landing, the engine being stopped during level flight.

The pod sections 16 and 12 fore and aft of the engine will usually be made replaceable as this facilitates loading up and unloading of the aircraft. One front or rear section can be quickly detached and another section substituted. To keep down drag losses during normal flight the air for the engine enters through an annular intake grille 20 that surrounds the pod a short distance forward of the engine and is substantially flush with the circumferential skin of the pod; that is to say there is no intake projection out beyond the circumferential pod skin as there would be if a scoop-style intake were used. The air enters the annular intake opening more or less radially and the intake ducts 21 within the pod lead it round into the fore-and-aft direction for entry to the engine 15. This intake arrangement means that there is no significant ram effect but the engine is nevertheless suitable for providing lift to facilitate take off and landing and for giving propulsion thrust in emergency.

FIGURES 2 and 3 show an alternative way of changing the direction of the engine jet efflux for emergency propulsion. This involves the provision of a cascade 22 that will ordinarily direct the jet down substantially vertically, as in FIGURE 2, but which can be rotated through 180° about an axis 23 inclined at about 45° to the fore-and-aft axis of the engine to re-direct the jet rearwardly, as in FIGURE 3.

It is possible to arrange more than one engine in the pod. Thus, since there is no provision for ram effect a second engine can be mounted facing in the reverse direction and back to back with the first engine, that is to say with the two exit ends of the engines directly facing one another. Such an arrangement is shown in FIGURE 4. Each of the two engines 15, 15' has its own nozzle 17, 17' to turn its jet efflux downwardly and these are close together and can be disposed substantially in the transverse vertical plane containing the aircraft centre of gravity so that a failure of one engine will not produce a significant pitching moment. A second engine 15 positioned in this way gives less drag than increasing the number of single engine pods, and as an alternative to lifting a greater load volume it will allow operation from bases at higher altitude or in a hotter climate.

The back to back engine arrangement of FIGURE 4 of course eliminates the possibility of providing for emergency forward propulsive thrust from the forward engine 15 unless the rear engine 15' is jettisoned.

The use of pods according to the invention is not confined to wing mounting; for example, a single pod could be carried under the fuselage centre line. Also there is no restriction to any particular type of mounting for the pod; it could be carried in the pannier or slipper tank manner as well as on a stem or pylon.

I claim:

1. A detachable pod for aircraft comprising a forward section containing an engine compartment, a jettisonable rear section containing a compartment for cargo or armament, a lift engine mounted in the engine compartment within said forward section, said lift engine being horizontally-oriented along the fore-and-aft centre line of the pod with its exhaust end directed aft, and nozzle means on the exhaust end of said lift engine which nozzle means is adjustable from a setting in which it deflects the jet stream downward and out through an opening in the underside of the pod to a setting in which, when said rear section has been jettisoned, the jet stream is directed aft.

2. A pod according to claim 1, further comprising a separable streamline nose section at the front end of said forward section.

3. A pod according to claim 2, further comprising a separable streamline tail section at the rear end of said rear section.

4. A pod according to claim 1, having a circumferential wall of which an annular portion ahead of the engine is formed as a grille to serve as an air intake, and further including ducting within said wall arranged to convey air back from said intake grille to the forward end of said engine.

5. A detachable pod for aircraft comprising a forward section containing a first compartment, a jettisonable rear section containing a second compartment, a first lift engine mounted in said first compartment, a second lift engine mounted in said second compartment, both said lift engines being horizontally-oriented in the fore-and-aft direction of the pod, said first engine having its exhaust end directed aft and said second engine having its exhaust end directed forward, first nozzle means on the exhaust end of said first engine arranged to deflect the jet stream therefrom downwardly and out through an opening in the underside of the pod, and second nozzle means on the exhaust end of said second engine arranged to deflect the jet stream therefrom downwardly and out through an opening in the underside of the pod, said first nozzle means being adjustable to a setting in which, when said rear section has been jettisoned, the jet stream is directed aft.

6. A pod for aircraft arranged for ready attachment to and detachment from the structure of an aircraft, said pod comprising a forward part and a jettisonable rear part, at least one lift engine contained in the forward part of the pod and horizontally disposed with its exhaust end directed aft, at least one compartment in the rear jettisonable part of the pod to contain a useful load of cargo or armament, and a jet nozzle assembly on the exhaust end of the engine which assembly is adjustable at will to direct the jet efflux rearwardly or downwardly.

References Cited by the Examiner
UNITED STATES PATENTS

| 2,584,961 | 2/52 | Beck et al. | 244—55 X |
| 2,870,987 | 1/59 | Griffith et al. | 224—23 |
| 2,879,014 | 3/59 | Smith et al. | 244—12 |
| 2,936,973 | 5/60 | Kappus | 244—23 |
| 2,977,080 | 3/61 | Zborowski. | |
| 3,057,582 | 10/62 | Kerry | 244—12 |
| 3,066,889 | 12/62 | Kelly | 244—12 |
| 3,126,170 | 3/64 | Dornier | 244—12 |

MILTON BUCHLER, *Primary Examiner.*

FERGUS S. MIDDLETON, *Examiner.*